UNITED STATES PATENT OFFICE.

BYRON B. GOLDSMITH, OF NEW YORK, N. Y.

INDURATED CASEIN COMPOUND.

964,964.  Specification of Letters Patent.  Patented July 19, 1910.

No Drawing. Original application filed October 7, 1907, Serial No. 396,189. Divided and this application filed January 2, 1909. Serial No. 470,392.

*To all whom it may concern:*

Be it known that I, BYRON B. GOLDSMITH, a citizen of the United States, residing in the borough of Manhattan, city, county, and State of New York, have invented a certain new and useful Improvement in Indurated Casein Compound, of which the following is a specification.

This application is a division of my pending application for improvement in indurated thermoplastic compound, filed Oct. 7th, 1907, Serial No. 396,189.

In my U. S. Patent Number 840,931, dated January 8th, 1909, I have described a process whereby a thermoplastic compound may be made from casein or its derivatives, as a convenient and cheap substitute for celluloid, rubber and the like; and I made it clear in said patent that the term "thermoplastic" was meant to describe those masses which, while relatively hard at ordinary temperatures, are rendered softer by heat, so as to permit the uniting of separate masses and the molding of any mass to any desired shape.

My present invention is based upon the discovery that, by uniting the action of converting agents with that of an indurating agent, such as formaldehyde, or its equivalents, upon casein, its derivatives and compounds, an improved result is obtained, and a mass is produced which is useful for many purposes.

My novel invention is based upon the discovery that the three principal elements of my compound, namely, the casein, a converting agent and an indurating agent (particularly formaldehyde or its equivalent) can be combined substantially as herein described and I have discovered that formaldehyde or its equivalent has the effect of correcting certain undesirable tendencies apt to follow the use of a converting agent, as will appear hereinafter.

The converting agent in my process is that chemical substance which, when combined or admixed with the albuminoid, acts whenever heated, to soften the same, but whose softening action is suspended or materially diminished upon lowering the temperature of the mass. Some of these converting agents are alpha-naphthol, beta-naphthol, benzoic acid, carbolic acid, hydrochinon, kresol, pyrocatechin, resorcin, salicylic acid, urea, benzoic acid, phthalic acid, phloroglucin, pyrogallol, anilin, toluidin and xylidin. Although these substances and their derivatives and compounds are known to me to give good results for the purposes above set forth, it is to be understood that I do not limit myself to these substances and their derivatives and compounds, but that the term "converting agent" as used herein refers to any compound or substance having the effect described.

In many cases the derivatives of casein or their compounds, or combinations of two or more of them, give results superior to those resulting from use of casein alone.

The degree of hardness of the thermoplastic compound in the cold state will vary with the particular converting agent or agents employed and with the proportions used. Thus a great variety of characteristics are obtained by suitable variations in proportions and qualities.

In the manufacture of my composition casein is mixed with the converting and the indurating agent, and heated until the mass assumes a suitable consistency for working on the mixing rolls. Any other method of uniting these substances may be resorted to by which they are brought into intimate contact. Instead of using the converting agents in their natural state, they may be used in solution, in alcohol or water, or other suitable liquid which is afterward driven off by heating. The amount of converting agent which can be mixed with the casein can be varied within wide limits when used in combination with an indurating agent and can be anywhere from less than one-quarter the amount of casein used, up to more than an equal amount, as the indurating agent seems to act on the converting agent in some way which makes this possible. Scraps of various substances may be mixed in with the masses thus formed in considerable quantities. Among these are celluloid scraps, finely divided albuminoids, bits of horn, rubber, resins, gums and coloring matter. Compounding substances or fillers can also be incorporated without departing from this invention.

The term "indurating agent" as herein used applies to those agents, like formaldehyde, which give to the compound greater toughness and permanency, increasing the resistance to the action of water and lessening the tendency to separation of ingredients. Another advantage of using the indurating agent is that it lessens the possible tendency of the mass to stick to the mold in forming and thus produce a better impression.

The use of formaldehyde or its equivalents in the manner herein specified has another valuable advantage. It is found that when the converting agent is a solid one and is used without an indurating agent in sufficient quantities to make an easily moldable mass, there is a tendency for the converting agent to separate and form a deposit upon the surface of the finished article. This gives a spotted appearance which would make an article unmarketable. On the other hand, if the indurating agent is used, this tendency is entirely overcome, and a composition made in accordance with my present invention may contain very large amounts of converting agent and can be made as plastic as desired without danger of spotting through the cause above described.

Instead of acting on the casein with the converting agent and the indurating agent so that the two are added together to the casein as above described, I can employ the converting agent first, by proceeding as follows: If only surface action is required, the compound of proteid and converting agent is molded into approximately final form, and may then be dipped into a solution of the indurating agent or may be subjected to gaseous action (where formaldehyde is used). After this treatment has been prolonged until the required depth of action is attained, the partly formed mass can be heated and molded to final form.

Again, my process may be carried out by sprinkling the combined albuminoid and converting agent in a finely divided state with a solution of the indurating agent and then, after sufficiently continued action, drying the mass and molding it by heat and pressure.

I have found that, in order to obtain the best results a "non-hygroscopic" converting agent should be used, and I have made a specific claim herein for converting agents of this character.

It is to be understood that my process may be carried out with a greater or less degree of induration, and in some cases it is not advisable to carry this process very far.

The indurating agent may obviously be first employed in manufacture of the material before compression and a second time upon the compressed mass or on the finished article.

I do not herein claim specifically the process of treating with the indurating agent before addition of the converting agent, as this is claimed in a divisional application filed April 27th, 1910, Serial No. 558,034.

What I claim is—

1. The process of producing a thermoplastic compound which consists in subjecting a casein to the combined action of a converting agent and an indurating agent and heating and pressing the mass, substantially as described.

2. The process of producing a thermoplastic compound which consists in mixing a converting agent with a casein and causing an indurating agent to act upon the mixed ingredients, substantially as described.

3. The process of producing a thermoplastic compound which consists in intimately mixing a converting agent and an indurating agent with casein and subjecting the mass to heat and pressure, substantially as described.

4. The process of producing a thermoplastic compound which consists in subjecting casein to the combined action of a converting agent and an indurating agent, substantially as described.

5. The process of producing a thermoplastic compound which consists in uniting casein with formaldehyde or its equivalent, and a converting agent, and heating and pressing the mass, substantially as described.

6. The process of producing a thermoplastic compound which consists in uniting casein with an indurating agent and a normally solid converting agent, and heating and pressing the mass, substantially as described.

7. The process of producing a thermoplastic compound which consists in subjecting casein to the combined action of beta-naphthol or its equivalent and formaldehyde or its equivalent, substantially as described.

8. The process of producing a thermoplastic compound which consists in uniting casein with an indurating agent and a solid, non-hygroscopic converting agent and then subjecting the mass to heat and pressure, substantially as described.

9. The process of producing a thermoplastic compound which consists in first uniting casein with an indurating agent and a converting agent non-volatile at ordinary temperatures, and then subjecting the mass to heat and pressure, substantially as described.

10. The process of producing a thermoplastic compound which consists in first uniting casein with formaldehyde and a converting agent non-volatile at ordinary temperatures and then subjecting the mass to heat and pressure, substantially as described.

11. The process of producing a thermoplastic compound which consists in uniting casein with formaldehyde or its equivalent and with a converting agent, and heating and pressing the mass, substantially as described.

12. The process of producing a thermoplastic compound which consists in uniting casein with formaldehyde or its equivalent, and beta-naphthol or its equivalent, and heating and pressing the mass, substantially as described.

13. The process of producing a thermoplastic compound which consists in first uniting casein with a converting agent and then subjecting the mass to the action of an indurating agent, substantially as described.

14. The process of producing a thermoplastic compound which consists in first uniting casein with a converting agent and an indurating agent and then subjecting mass to the further action of an indurating agent, substantially as described.

15. The process of producing a thermoplastic compound which consists in uniting casein with beta-naphthol and modifying the mass by the action of formaldehyde, substantially as described.

16. A composition of matter consisting of a thermoplastic casein modified by an indurating agent, substantially as described.

17. A composition of matter consisting of a thermoplastic casein modified by formaldehyde, substantially as described.

18. A composition of matter consisting of casein united with beta-naphthol or its equivalent, and an indurating agent, substantially as described.

19. A composition of matter consisting of casein united with beta-naphthol and modified by formaldehyde, substantially as described.

20. A composition of matter consisting of casein united with a solid converting agent and an indurating agent, substantially as described.

21. A composition of matter consisting of casein united with a mixture of a converting agent and an indurating agent, substantially as described.

22. A composition of matter consisting of a mixture of casein, beta-naphthol or its equivalent, and formaldehyde or its equivalent, substantially as described.

23. A composition of matter consisting of a mixture of casein, a converting agent and an indurating agent, substantially as described.

BYRON B. GOLDSMITH.

Witnesses:
H. S. MacKaye,
M. A. Butler.